(12) United States Patent
Aichert et al.

(10) Patent No.: US 12,493,964 B2
(45) Date of Patent: Dec. 9, 2025

(54) METHODS AND SYSTEMS FOR PROVIDING TRAINING DATA SETS FOR TRAINING A MACHINE-LEARNED SEGMENTATION ALGORITHM FOR USE IN DIGITAL PATHOLOGY

(71) Applicants: Siemens Healthcare GmbH, Erlangen (DE); Georg-August-Universitaet Goettingen Stiftung oeffentlichen Rechts Universitaetsmedizin Goettingen, Goettingen (DE)

(72) Inventors: Andre Aichert, Erlangen (DE); Marvin Teichmann, Erlangen (DE); Hanibal Bohnenberger, Bovenden (DE); Arnaud Arindra Adiyoso, Nuremberg (DE)

(73) Assignees: SIEMENS HEALTHINEERS AG, Forchheim (DE); GEORG-AUGUST-UNIVERSITAET GOETTINGEN STIFTUNG OEFFENTLICHEN RECHTS UNIVERSITAETSMEDIZIN GOETTINGEN, Goettingen (DE)

( * ) Notice: Subject to any disclaimer, the term of this patent is extended or adjusted under 35 U.S.C. 154(b) by 327 days.

(21) Appl. No.: 18/186,406

(22) Filed: Mar. 20, 2023

(65) Prior Publication Data
US 2023/0306606 A1    Sep. 28, 2023

(30) Foreign Application Priority Data

Mar. 23, 2022    (DE) ............ 10 2022 202 838.4

(51) Int. Cl.
G06T 7/11    (2017.01)
G06T 7/00    (2017.01)
G06T 7/33    (2017.01)

(52) U.S. Cl.
CPC ............ *G06T 7/11* (2017.01); *G06T 7/0012* (2013.01); *G06T 7/337* (2017.01);
(Continued)

(58) Field of Classification Search
None
See application file for complete search history.

(56) References Cited

U.S. PATENT DOCUMENTS

2011/0081066 A1    4/2011    Jolly et al.
2012/0235679 A1    9/2012    Ding et al.
(Continued)

FOREIGN PATENT DOCUMENTS

WO    WO 2020198380 A1    10/2020

OTHER PUBLICATIONS

Goodfellow I. et al.: Generative adversarial networks. Communications of the ACM, 63(11), 139-144.
(Continued)

*Primary Examiner* — Miya J Cato
(74) *Attorney, Agent, or Firm* — Harness, Dickey & Pierce, P.L.C.

(57) ABSTRACT

One or more example embodiments are methods and corresponding systems for providing a training data set for training a segmentation algorithm for segmenting whole-slide images in digital pathology as well as the use of the training data and corresponding ML segmentation algorithms. For example, a first segmentation of a whole slide image is refined based on an automatically generated annotation which has a higher level of detail than the first segmentation. A second segmentation results, which may be used as a ground truth for training the ML segmentation algorithm on the basis of the whole slide image.

15 Claims, 6 Drawing Sheets

(52) U.S. Cl.
CPC .............. *G06T 2207/20016* (2013.01); *G06T 2207/20081* (2013.01); *G06T 2207/30024* (2013.01); *G06T 2207/30096* (2013.01)

(56) References Cited

U.S. PATENT DOCUMENTS

| | | | |
|---|---|---|---|
| 2020/0211189 A1* | 7/2020 | Yip | G06V 20/69 |
| 2021/0150701 A1 | 5/2021 | Thagaard et al. | |
| 2021/0158524 A1 | 5/2021 | Madabhushi et al. | |
| 2021/0166785 A1* | 6/2021 | Yip | G06V 10/44 |
| 2022/0146418 A1* | 5/2022 | Bauer | G01N 21/35 |
| 2023/0274534 A1 | 8/2023 | Aichert et al. | |
| 2023/0282011 A1 | 9/2023 | Teichmann et al. | |
| 2023/0342927 A1 | 10/2023 | Aichert et al. | |

OTHER PUBLICATIONS

Karen Simonyan and Andrew Zisserman. Very deep convolu-tional networks for large-scale image recognition. arXiv preprint arXiv:1409.1556, 2014.

Kaiming He, Xiangyu Zhang, Shaoqing Ren, and Jian Sun. Deep residual learning for image recognition. CoRR, abs/1512.03385, 2015.

Kaur T., et al.:"Automated brain image classification based on VGG-16 and transfer learning." 2019 International Conference on In-formation Technology (ICIT). IEEE, 2019.

Bulten W. et al.: "Epithelium segmentation using deep learning in H&Estained prostate specimens with immunohistochemistry as reference standard", SCienTific REPOrTS | (2019) 9:864 ; https://www.nature.com/articles/s41598-018-37257-4.

Mateen M. et al.: "Fundus image classification using VGG-19 architecture with PCA and SVD." Symmetry 11.1 (2019).

Yang, L.; Zhang, Y. et al: "Suggestive annotation: A deep active learning framework for biomedical image segmentation", in: International conference on medical image computing and computerassisted intervention, Springer. pp. 399-407, 2017. https://arxiv.org/pdf/1706.04737.pdf.

Zheng, H.; Yang, L. et al.: "Biomedical image segmentation via representative annotation", in: Thirty-Third AAAI Conference on Artificial Intelligence, 3901-3908, 2019. https://doi.org/10.1609/aaai.v33i01.33015901.

Ayyachamy S. et al.: "Medical image retrieval using Resnet-18." Medical Imaging 2019: Imaging Informatics for Healthcare, Research, and Applications. vol. 10954. International Society for Optics and Photonics, 2019. A VGG-16 or VGG-19 CNN.

Xu Zhaoyang et al: "GAN-based Virtual Re-Staining: A Promising Solution for Whole Slide Image Analysis"; arXiv preprint; arXiv:1901.04059; 2019.

Ilija Radosavovic, Raj Prateek Kosaraju, Ross Girshick, Kaiming He, and Piotr Dollár. Designing network design spaces. In Proceedings of the IEEE/CVF Conference on Com-puter Vision and Pattern Recognition, pp. 10428-10436, 2020.

Mingxing Tan and Quoc V Le. Efficientnet: Rethinking model scaling for convolutional neural networks. arXiv preprint arXiv:1905.11946, 2019.

* cited by examiner

WSI2

A
125

METHODS AND SYSTEMS FOR PROVIDING TRAINING DATA SETS FOR TRAINING A MACHINE-LEARNED SEGMENTATION ALGORITHM FOR USE IN DIGITAL PATHOLOGY

CROSS-REFERENCE TO RELATED APPLICATION(S)

The present application claims priority under 35 U.S.C. § 119 to German Patent Application No. 10 2022 202 838.4, filed Mar. 23, 2022, the entire contents of which are incorporated herein by reference.

FIELD

Various examples of the disclosure pertain to determining a ground truth for when performing a training of a machine-learning algorithm in the context of digital pathology. More specifically, various examples pertain to determining a segmentation of a whole slide image depicting tissue of multiple types and using the segmentation for training of a segmentation algorithm.

RELATED ART

In histopathology, a tissue sample of a patient is inspected to study a manifestation of a disease such as cancer.

Conventionally, a practitioner can inspect the tissue samples—e.g., stained using a chemical stain—using a microscope. In further detail, thin tissue slides are prepared by sectioning a tissue sample and staining and fixating the slice section. Then, an image is acquired depicting the tissue slide. The result is often referred to as whole-slide image. The digitization of such images makes it possible to digitally analyze and process tissue samples. This is referred to as digital pathology.

Recently, algorithmic analysis of digitized tissue samples has become possible. Reference techniques of digital pathology use Convolutional Neural Networks (CNNs) as an example of machine-learning (ML) algorithms. Such techniques are described in: Karen Simonyan and Andrew Zisserman. Very deep convolutional networks for large-scale image recognition. arXiv preprint arXiv:1409.1556, 2014. Such techniques are further described in: Kaiming He, Xiangyu Zhang, Shaoqing Ren, and Jian Sun. Deep residual learning for image recognition. CoRR, abs/1512.03385, 2015. Such techniques are further described in: Mingxing Tan and Quoc V Le. Efficientnet: Rethinking model scaling for convolutional neural networks. arXiv preprint arXiv:1905.11946, 2019. Such techniques are further described in: Ilija Radosavovic, Raj Prateek Kosaraju, Ross Girshick, Kaiming He, and Piotr Dollár. Designing network design spaces. In Proceedings of the IEEE/CVF Conference on Computer Vision and Pattern Recognition, pages 10428-10436, 2020.

Oftentimes, digital pathology requires processing large images, e.g., whole-slide tissue images (WSI). A whole-slide image depicts a microscopically magnified tissue slide of macroscopic scale, e.g., centimeters; thus, the whole-slide image can include a large number of pixels. Whole-slide images typically come at a size of tens of thousands of pixels in each dimension. Tissue slides either from biopsies or resected tumor tissue are prepared on glass slides, which can be scanned by a digital microscope in high resolution (gigapixels) and high throughput. Because of their size and number, whole-slide image are especially well-suited for data-hungry ML algorithms. They can be processed by an ML algorithm as a whole or on the basis of small image patches cut out from the large images.

It has been found that training ML algorithms to process whole-slide images can be time consuming and/or error prone. The sheer amount of image data oftentimes requires large amounts of expensive annotations for supervised learning. Annotations—including ground-truth labels for the training process—are expensive and time consuming and pathology requires specific solutions with training and validation data for a myriad of specific tissue or cancer types, organs, resection versus biopsy and possibly parameters of the preparation of the physical tissue sample (fixation, dies, slicing etc.). For example, for a standard tumor recognition task which is used as intermediate representation in many ML-based pathology systems, the pathologist is required to provide local, ideally pixelwise ground-truth labels for the training process of the ML algorithm. In addition, obtaining high-resolution ground-truth labels can be challenging since there are many fine structures and areas which are hard to categorize, even for an expert.

There are several approaches to address high cost and lack of annotations. First of all, not all samples of training data are equally informative. Annotating frequent and/or simple-to-detect samples may not contribute in the same amount to better performance as annotation of rare and/or difficult-to-detect samples of training data. A good set of samples is diverse across the various types that are to be detected by the ML algorithm and covers the whole distribution of possible samples. Active learning is an interactive process, where the added value of having a certain sample labeled is explicitly modelled, thus presenting the annotator with a careful selection of valuable samples. Visual similarity can be assessed in an unsupervised manner to maximize the diversity of samples. Uncertainty can be used as an indicator that more data of a certain kind is needed. Most active learning approaches use the latter or a combination of the two criteria to maximize the training performance while minimizing the amount of labeled data. An example of this process that was also applied to whole-slide images can be found in Yang, Lin, et al. "Suggestive annotation: A deep active learning framework for biomedical image segmentation." International conference on medical image computing and computer-assisted intervention. Springer, Cham, 2017. An example that applies a one-shot strategy and therefore mostly relies on the first criterion can be found in Zheng, Hao, et al. "Biomedical image segmentation via representative annotation." Proceedings of the AAAI Conference on Artificial Intelligence. Vol. 33. No. 01. 2019.

SUMMARY

Accordingly, a need exists for advanced techniques for providing training data sets for ML algorithms to process whole-slide images. Specifically, a need exists for training ML algorithms segmenting whole-slide images to detect different tissue types.

Example embodiments provide methods and systems that allow for an improved way of providing training data sets for training ML segmentation algorithms for segmenting whole-slide images according to a plurality of different tissue types. Further, one or more example embodiments of the present invention provide methods and systems that enable training a ML segmentation algorithm on that basis and for using such algorithm for segmenting whole-slide images.

Example embodiments include a method for providing a training data set, a method for training a ML segmentation algorithm, a method for segmenting whole-slide images, corresponding systems, corresponding computer-program products, and computer-readable storage media according to the independent claims. Alternative and/or preferred embodiments are object of the dependent claims.

BRIEF DESCRIPTION OF THE DRAWINGS

Characteristics, features and advantages of the invention, as well as the manner they are achieved, become clearer and more understandable in the light of the following description of embodiments, which will be described in detail with respect to the figures. This following description does not limit the invention on the contained embodiments. Same components, parts or steps can be labeled with the same reference signs in different figures. In general, the figures are not drawn to scale. In the following.

DETAILED DESCRIPTION

Figure 1:
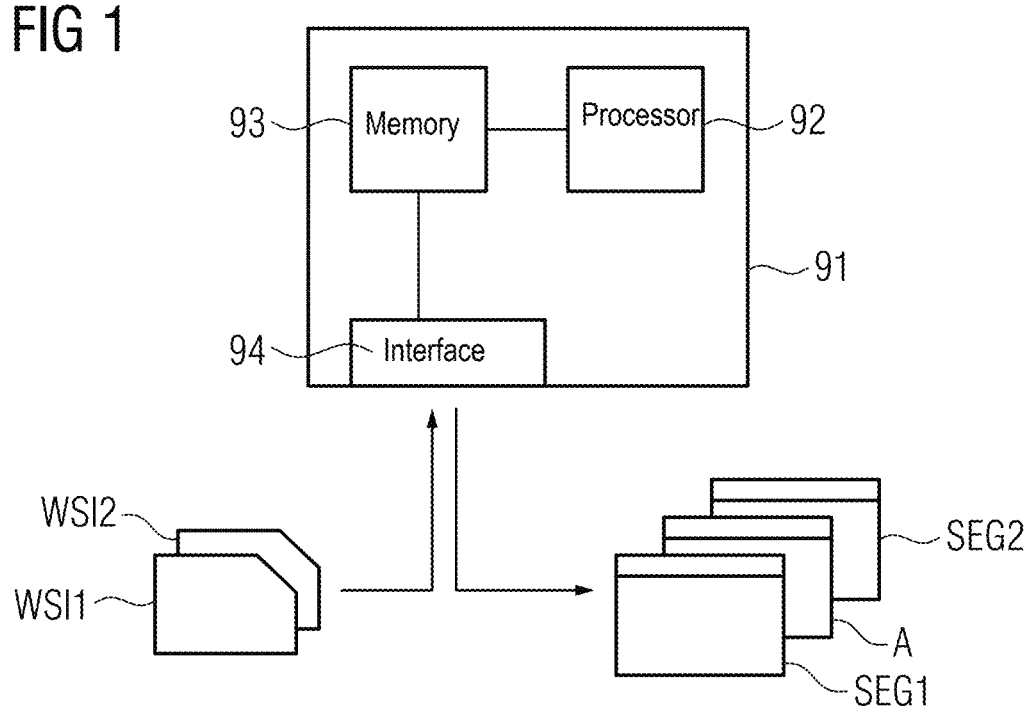
FIG. 1 schematically depicts an embodiment of a system for providing: training data for training a ML segmentation algorithm, and/or a ML segmentation algorithm, and/or a segmentation of a whole-slide image by applying a ML segmentation algorithm.

In the following, a technical solution according to one or more example embodiments of the present invention is described with respect to the claimed apparatuses as well as with respect to the claimed methods. Features, advantages or alternative embodiments described herein can likewise be assigned to other claimed objects and vice versa. In other words, claims addressing the inventive method can be improved by features described or claimed with respect to the apparatuses. In this case, e.g., functional features of the method are embodied by objective units or elements of the apparatus.

According to an aspect, a computer-implemented method for providing a training data set for training a segmentation algorithm is provided, wherein the segmentation algorithm is to be trained for segmenting a whole-slide image depicting a tissue of multiple tissue types in accordance with a plurality of different tissue types. The method comprises a plurality of different steps. A first step is directed to obtain a whole-slide image depicting a tissue slice (of a patient). A further step is directed to obtain a first segmentation of the whole-slide image and for the plurality of different tissue types, the first segmentation having a first level of detail. A further step is directed to obtain an annotation of the tissue slice, the annotation having a level of detail greater than the first level of detail. A further step is directed to generate a second segmentation of the whole-slide image and for the plurality of different tissue types based on the first segmentation and the annotation, the second segmentation having a level of detail greater than the first level of detail. A further step is directed to provide the training data set comprising the whole-slide image and the second segmentation.

In particular, the segmentation algorithm may be a machine-learned (ML) segmentation algorithm. In general, a ML algorithm mimics cognitive functions that humans associate with other human minds. In particular, by training based on training data, the ML algorithm is able to adapt to new circumstances and to detect and extrapolate patterns.

In general, parameters of a ML algorithm can be adapted via training. In particular, supervised training, semi-supervised training, unsupervised training, reinforcement learning and/or active learning can be used. Furthermore, representation learning (an alternative term is "feature learning") can be used. In particular, the parameters of the ML algorithm can be adapted iteratively by several steps of training.

In particular, a trained function can comprise a neural network, a support vector machine, a decision tree and/or a Bayesian network, and/or the ML algorithm can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

As a general rule, the neural networks include multiple layers. The input to a first layer is the input image (in this case a whole-slide image). Each layer can apply one or more mathematical operations on the input values, e.g., convolutions, nonlinear excitations, pooling operations, to give just a few examples. The input to a layer can be formed by the output of a preceding layer (feed-forward). Feedback of values or skip-connection skipping layers are possible.

A neural network for digital pathology, i.e., as comprised in the ML segmentation algorithm, may infer at least one semantic histopathology feature. The at least one semantic histopathology feature can describe whether the tissues sample is a manifestation of a disease. It would be possible to segment tissue in a whole-slide image, according to various types. Healthy and/or unhealthy tissue may be detected and specifically localized. In particular, it would be possible to employ a convolutional neural network as the ML segmentation algorithm. For instance, ResNet-18 may be used, see Ayyachamy, Swarnambiga, et al. "Medical image retrieval using Resnet-18." Medical Imaging 2019: Imaging Informatics for Healthcare, Research, and Applications. Vol. 10954. International Society for Optics and Photonics, 2019. In particular, a VGG-16 or VGG-19 CNN could be used, see: Mateen, Muhammad, et al. "Fundus image classification using VGG-19 architecture with PCA and SVD." Symmetry 11.1 (2019): 1; or Kaur, Taranjit, and Tapan Kumar Gandhi. "Automated brain image classification based on VGG-16 and transfer learning." 2019 International Conference on Information Technology (ICIT). IEEE, 2019.

Whole-slide images to be processed by the ML segmentation algorithm may be two-dimensional digital images having a plurality of pixels. Whole slide images could have a size of at least 4.000×4.000 pixels, or at least 10.000× 10.000 pixels, or at least 1E6×1E6 pixels. A whole-slide image may image a tissue slice or slide of a patient.

The preparation of the tissue slices from the tissue samples can comprise the preparation of a section from the tissue sample (for example with a punch tool), with the section being cut into micrometer-thick slices, the tissue slices. Another word for section is block or punch biopsy. Under microscopic observation, a tissue slice can show the fine tissue structure of the tissue sample and in particular the cell structure or the cells contained in the tissue sample. When observed on a greater length scale, a whole-slide image can show an overview of the tissue structure and tissue density.

The preparation of a tissue slice further may comprise the staining of the tissue slice with a histopathological staining. The staining in this case can serve to highlight different structures in the tissue slice, such as, e.g., cell walls or cell nuclei, or to test a medical indication, such as, e.g., a cell proliferation level. Different histopathological stains are used for different purposes in such cases.

To create the whole-slide image, the stained tissue slices are digitized or scanned. To this end, the tissue slices are scanned with a suitable digitizing station, such as, for example, a whole-slide scanner, which preferably scans the entire tissue slice mounted on an object carrier and converts it into a pixel image. In order to preserve the color effect from the histopathological staining, the pixel images are preferably color pixel images. Since in the appraisal both the overall impression of the tissue and also the finely resolved cell structure is of significance, the individual images contained in the histopathology image data typically have a very high pixel resolution. The data size of an individual image can typically amount to several gigabytes.

In general, a whole-slide image may depict multiple tissue types of relevance for the diagnostic process in digital pathology. The ML segmentation algorithm is supposed to identify a plurality of these tissue types and provide the segmentation result as segmentation or segmentation mask. 'A plurality' in this regard may mean at least two tissue types. In particular, the ML segmentation algorithm may segment a whole-slide image to distinguish between a type of "cancerous" and another type of "non-cancerous" tissue. There are other examples possible. For instance, it would be possible to segment a whole-slide image to determine tissue that is infiltrated by immune cells, as a respective tissue type. Further tissue types may relate to blood vessels, connective tissue, necrotic tissue, etc. present in the whole-slide image. It would further be possible to segment regions of the whole-slide image that do not show tissue altogether, i.e., "no tissue" tissue types. The particular types and number of types of the tissue to be distinguished by the ML segmentation algorithm depend on the training of the ML segmentation algorithm—and also on the histopathological stain used for the whole-slide image.

The first segmentation may identify a plurality of regions in the whole-slide image. Specifically, the first segmentation may comprise a segmentation mask delineating regions in the whole-slide image, each region corresponding to a respective one of the plurality of tissue types (which the ML segmentation algorithm is supposed to recognize/segment in the deployment phase). Multiple regions can be defined in the first segmentation. Different regions may be associated with different tissue types.

Accordingly, the first segmentation can include multiple labels. Each label may be associated with a respective region identified by the first segmentation. Each label may be indicative of one tissue type of the plurality of tissue types. In particular, each label may be indicative of a majority type of the tissue in that region. There may be minority types of tissue also present in the respective region, at least to some certain extent.

The first segmentation may thus comprise multiple segments/regions of the whole-slide image that are associated with different tissue types of the plurality of tissue types.

According to some examples, the first segmentation comprises outlines or segmentation masks of one or more cancerous regions or tumor regions each comprising a plurality of cancerous cells or tumor cells.

The term "level of detail" as used herein may pertain to a spatial resolution with which borders of regions of segmentations or annotations are defined. For instance, at a low level of detail, edge points of a polyline delimitating regions associated with a given label may be spaced apart by a larger distance than for a higher level of detail. Alternatively or additionally, "level of detail" could pertain to a size threshold below which structures are neglected. For instance, an area that is associated with the label "non-cancerous tissue" may include small cancerous structures below a size threshold. Alternatively or additionally, "level of detail" could pertain to a maximum count of structures/tissue fractions of minority type in an area; e.g., considering an area that is associated with the label "non-cancerous tissue", such area may include cancerous tissue instances up to a certain quota.

The first (or initial) level of detail may pertain to a certain accuracy with which the first segmentation is determined. For instance, the first level of detail may specify a spatial resolution of boundaries of regions associated with a common tissue type (of the plurality of tissue types) or corresponding label. For instance, these boundaries may not be specified with the resolution on pixel level. For instance, the first level of detail may allow for a certain quota and/or for certain small-sized tissue fractions or segments (i.e., pieces of tissue) of deviating type, i.e., minority types within an area of the region that is associated with a majority type. According to some examples, the first level of detail may correspond to a resolution of the first segmentation on a super-cellular level, meaning that individual cells of the tissue slice are not resolved in the first segmentation (the first resolution). According to some examples, the first segmentation comprises outlines of tumor regions at the first level of detail (i.e., comparably "rough" outlines compared to the annotation or second segmentation).

Generally, the first level of detail of the first segmentation can be comparatively low. Thus, the first segmentation may not be suited, in all scenarios, to serve as a basis for the setting of the parameters of an ML segmentation algorithm so that the ML segmentation algorithm offers a sufficient level of detail in inference.

The annotation may identify a plurality of (further) regions in the whole-slide image. Specifically, the annotation may comprise a segmentation mask delineating (further) regions in the whole slide image. Multiple (further) regions can be defined in the annotation. Different (further) regions may be associated with different tissue types.

The annotation may thus comprise multiple segments/regions of the whole-slide image. Thereby the multiple segments/regions comprised in the annotation may be different than the segments/regions comprised in the first segmentation. Accordingly, the annotation may be seen as a complementary (i.e., different) segmentation to the first segmentation.

According to some examples, the annotation comprises outlines or segmentation masks of one or more cancerous cells or tumor cells.

According to some examples, the annotation does not involve manual annotations and/or is based on automated image processing of image data pertaining to the tissue slice.

The annotation has a greater level of detail than the first segmentation. This may pertain to a greater accuracy with which the annotation is determined as compared to the first segmentation. For instance, the level of detail of the annotation may specify a greater spatial resolution of boundaries of regions as compared to the first segmentation. For instance, these boundaries may be specified with a resolution on pixel level. For instance, the greater level of detail may allow for a smaller quota and/or for smaller tissue fractions or segments (i.e., pieces of tissue) of deviating type as compared to the first segmentation. This may mean that a size threshold and/or a quota of minority type instances may be smaller than for the first level of detail. According to some examples, the level of detail of the annotation may correspond to a resolution on a cellular level, meaning that the annotation resolves individual cells of the tissue slice. According to some examples, the greater level of detail may mean that the annotation and the second segmentation comprise outlines of tumor regions at the greater level of detail (i.e., comparably "fine" outlines compared to the first segmentation).

The second segmentation may identify a plurality of regions in the whole-slide image. Specifically, the second segmentation may comprise a segmentation mask delineating regions in the whole slide image, each region corresponding to a respective one of the plurality of tissue types (which the ML segmentation algorithm is supposed to recognize/segment in the deployment phase).

Accordingly, the second segmentation can include multiple labels. Each label may be associated with a respective region identified by the second segmentation. Each label may be indicative of one tissue type of the plurality of tissue types.

Like the first segmentation, the second segmentation may comprise multiple segments/regions of the whole-slide image that are associated with different tissue types of the plurality of tissue types.

However, the level of detail of the second segmentation is higher than the first level of detail of the first segmentation. Accordingly, the multiple segments/regions comprised in the second segmentation may be different than the segments/regions comprised in the first segmentation—albeit the second segmentation may in principle comprise the same labels and distinguish between the same tissue types as the first segmentation.

The second segmentation can be conceived as a refined version of the first segmentation which has been refined using the information comprised in the annotation. Accordingly, the second segmentation has a level of detail which is at least higher than the first level of detail. According to some examples, the level of detail of the second segmentation is at least equivalent to the level of detail of the annotation.

The second segmentation can thus serve as a ground truth for setting parameters of the ML segmentation algorithm. Hence, the whole-slide image and the second segmentation can constitute training data for the training of the ML segmentation algorithm.

According to various examples, it is possible to refine segmentations of whole-slide images for the purpose of training ML segmentation algorithms, i.e., by obtaining a first segmentation that has a first level of detail (initial segmentation) and, based on this initial segmentation, determining a second segmentation (refined segmentation) of the whole-slide image that has a second level of detail which is higher than the first level of detail.

By such techniques, it is possible to reduce the efforts for the annotation process that is used to determine the initial segmentation. In other words, the ground truth for performing the training of the ML segmentation algorithm can be determined comparably fast.

Said setting of the parameters of the ML segmentation algorithm can benefit from such higher level of detail of the second segmentation. The ML segmentation algorithm can thereby be trained to deliver segmentation results at the level of detail of the second segmentation.

As compared to active learning, the process does not involve detailed expert input as the annotation can be provided automatically. Rough tumor region outlines as provided by the first segmentation can be produced in a few minutes per whole-slide image as they are neither required to be complete nor to be pixel-accurate or accurate on a cellular level.

In addition, the annotation is not used for inference time since the training data does not include this information and training is effected based on the refined segmentation alone. Thus, the final method may be applied to whole-slide images directly.

According to some examples, in the step of obtaining the annotation, the annotation is obtained independently from the first segmentation.

This is beneficial in that cross-talk between the generation of the first segmentation and the ensuing refinement is avoided ruling out artefacts in the training stage. Further, this may ensure that the annotation is not required when the ML segmentation algorithm is deployed in the field.

According to an aspect, the annotation comprises a segmentation for at least one complementary tissue type different to the plurality of tissue types addressed by the first segmentation.

The complementary tissue type may be a tissue type the ML segmentation algorithm is not supposed to recognize/segment in the deployment phase. Accordingly, the annotation may include at least one complementary label not comprised in the labels of the first segmentation. The at least one complementary label may be associated with one or more regions identified by the annotation. The complementary label may be indicative of a complementary tissue type not comprised in the plurality of tissue types.

For instance, while the plurality of tissue types labeled in the first segmentation may comprise cancerous tissue regions and non-cancerous tissue regions, the complementary tissue type may comprise cancerous cells. Specifically, the annotation may identify adenocarcinoma as tissue type.

Accordingly, the annotation may be seen as a complementary segmentation providing additional information not comprised in the first segmentation. With that, the first segmentation can effectively be refined based on the annotation.

According to an aspect, obtaining the annotation comprises obtaining a complementary whole-slide image different from the whole-slide image, the complementary whole-slide image depicting the tissue slice or a proximal tissue slice of the tissue slice, and obtaining the annotation by processing the complementary whole-slide image, optionally by applying a threshold to the complementary whole-slide image.

The complementary whole-slide image may be essentially of the form of the whole-slide image as described above. It is different from the whole-slide image in that it comprises different image data—albeit depicting essentially the same tissue region as the whole slide image. Therewith, the complementary whole-slide image may provide complementary information about the tissue slice which can be exploited for obtaining the annotation. For instance, the complementary whole-slide image may have undergone different image (pre)processing steps (such as different contrast and brightness adjustments) as compared to the whole-slide image. In particular, the complementary whole-slide image may be a whole-slide image specifically generated for providing the annotation which is (mostly) not generated in the clinical routine when the ML segmentation algorithm is deployed. In other words, the ML segmentation algorithm does not "see" the complementary whole-slide image—neither in the training phase nor when deployed (just like the annotation is not inputted directly into the ML segmentation algorithm).

The provision of a complementary whole-slide image may allow for a comparably easy processing for obtaining the annotation. According to some examples, the annotation may be obtained simply by applying an image threshold to the complementary whole-slide image, i.e., filtering for predetermined pixel values in the complementary whole-slide image. With that, e.g., cancerous cells such as adenocarcinoma cells can be obtained in a pixel accurate fashion.

As an alternative, the complementary whole-slide image may be inputted in a dedicated ML segmentation algorithm (different from the ML segmentation algorithm the training data is to be provided for) which has been trained to predict annotations based on complementary whole-slide images. In principle, the dedicated ML segmentation algorithm may be of the same form as the ML segmentation algorithm.

According to an aspect, the whole slide image depicts the tissue slice stained with a first histopathological stain, and the complementary whole slide image depicts the tissue slice or the proximal tissue slice stained with a second histopathological stain different than the first histopathological stain.

By basing the complementary whole-slide image on a different histopathological stain, complementary image information is provided which can be used for the annotation. As each histopathological stain highlights specific structures in a tissue slice, the second histopathological stain can be used to specifically highlight structures which are helpful for increasing the level of detail of the first segmentation. For instance, the second histopathological stain may be configured to highlight cellular structures which may allow for a cell-accurate identification of tumor regions. In particular, the second histopathological stain may be stain which is less common in the clinical routine as compared to the first histopathological stain.

According to an aspect, the first histopathological stain is a H&E stain, and/or the second histopathological stain is an immunohistochemistry stain, in particular comprising keratin targeting biomarkers.

In this regard, H&E stands for hematoxylin and eosin. Hematoxylin stains cell nuclei, and Eosin stains the extracellular matrix and cytoplasm. H&E is the most widely used stain in digital pathology—making also the ML segmentation algorithm widely applicable.

Immunohistochemistry stains, or short IHC stains, involve the process of selectively identifying antigens (proteins) in cells of a tissue section by exploiting the principle of antibodies binding specifically to antigens in biological tissues. With that, structures can be highlighted which are not accessible with other stains such as H&E. With that, an additional readout may be provided for further detailing the first segmentation.

In particular, the IHC stain may comprise biomarkers (e.g., in the form of antibodies) configured to target (cytoskeletal) keratins. Keratins form part of the cell cytoskeleton and define the mechanical properties of cells. As such, the abundance of keratins makes up a good tumor marker as keratin expression levels are often altered in tumor cells. Accordingly, using keratin IHC stains may enable to identify adenocarcinoma (neoplasia of epithelial tissue). Specifically, the IHC stain may comprise keratin biomarkers targeting different keratin forms such as CK-5, CK-8, CK-14, CK-18 (wherein 'CK' stands for 'cytoskeletal keratin'). Selfspeaking, the IHC stain may comprise different or additional biomarkers such as p63 and AMACR biomarkers.

According to an aspect, obtaining the complementary whole-slide image comprises: removing the first histopathological stain from the tissue slice, staining the tissue slice with the second histopathological stain so as to generate a re-stained tissue slice, and imaging the re-stained tissue slice so as to generate the complementary whole-slide image.

In other words, the tissue slice is first washed and then re-stained with the second histopathological stain. With that, essentially the same structures as in the whole-slide image can be imaged for the complementary whole-slide image. This not only enables acquiring complementary information but also ensures that the complementary whole-slide image is readily comparable with the whole-slide image.

According to an aspect, obtaining the complementary whole-slide image comprises: providing an image processing function configured to simulate image data depicting a tissue slice stained with the second histopathological stain based on image data of the tissue slice stained with the first histopathological stain, and generating the complementary whole-slide image by applying the image processing function on the whole-slide image.

The image processing function may be a machine learned function which has been trained according to the above task of simulating a complementary whole-slide image. In particular, the image processing function may be an image-to-image neural network or, more specifically, a convolutional image-to-image neural network. According to some examples, the image processing function may be a generative adversarial network (GAN). According to some examples, the image processing function may be trained based on a whole-slide image and a "real" complementary whole-slide image which may be provided as herein described.

The provision of the complementary whole-slide image by ways of the image processing function allows for an automatic generation of the complementary whole-slide image without manual processing steps. Moreover, the result is inherently very well comparable with the whole-slide image since the tissue slice is not physically altered as compared to the washing step where washing may destroy some regions of the tissue.

According to an aspect, obtaining the complementary whole-slide image comprises: obtaining the proximal tissue slice from the same tissue sample as the tissue slice, the proximal tissue slice preferably being a proximal slice of and/or a consecutive slice with respect to the tissue slice, staining the proximal tissue slice with the second histopathological stain, and imaging the stained proximal tissue slice so as to generate the complementary whole slide image.

Proximal or even consecutive slices are typically of the order of several μm apart from the tissue slice. As a consequence, proximal or consecutive slices may show a tissue section which is similar with the tissue slice to an extend that a one-to-one comparison is possible. Providing the complementary whole-slide image based on a proximal or consecutive slice has the advantage that the complementary whole-slide image can be prepared in parallel to the whole-slide image. Further, the destruction of tissue regions due to the washing can be avoided.

According to an aspect, the step of obtaining the annotation comprises: extracting, at the level of detail greater than the first level of detail, one or more features from the complementary whole-slide image, the features optionally relating to one or more cytoskeleton features of cells depicted in the complementary whole-slide image, wherein the annotation is determined based on a segmentation of the one or more features.

According to some examples, the one or more features may relate to one or more characteristics of cancerous cells and/or adenocarcinoma. In particular, the one or more features may relate to cytoskeletal keratins highlighted by the second histopathological stain. According to an aspect, the feature extraction may be performed by the dedicated ML segmentation algorithm which has been trained to predict annotations based on complementary whole-slide images.

By automatically extracting features at a greater detail level than the first level of detail annotations with an inherently improved resolution may be obtained.

According to an aspect, the step of generating the second segmentation comprises aligning and/or registering the first segmentation with the annotation.

According to some examples, aligning the first segmentation with the annotation may be performed manually by a user or automatically by one or more image processing functions by spatially matching the whole-slide image with the complementary whole-slide image.

By aligning the first segmentation with the annotation, the quality of the second segmentation and, therewith, the training data can be improved.

According to an aspect, the step of aligning and/or registering comprises providing an image registration between the whole slide image and the complementary whole-slide image, and aligning the first segmentation with the annotation based on the image registration.

Providing at least one image registration, according to some examples, may in general comprise registering a target image (e.g., the whole-slide image) with a reference image (e.g., the complementary whole-slide image). According to some examples, this may comprise obtaining a transformation function between target and reference image that determines a relationship between the coordinate systems of the target image data and the reference image data such that each physiological location in the target image is mapped to the same physiological location in the reference image and vice versa. Thus, the transformation may comprise a plurality of individual displacement vectors respectively associated with the pixels of the target image and the reference image.

According to some examples, the registration may comprise a rigid registration. A rigid registration may comprise a registration in which the coordinates of pixels in one image are subject to rotation and translation in order to register the image to another image. According to some examples, the registration may comprise and affine registration. An affine registration may comprise a registration in which the coordinates of data points in one image are subject to rotation, translation, scaling and/or shearing in order to register the image to another image. Thus, a rigid registration may be considered to be a particular type of affine registration. According to some examples, the registration may comprise a non-rigid registration. A non-rigid registration may provide different displacements for each pixel of the image to be registered and can, for example, use non-linear transformations, in which the coordinates of pixels in one image are subject to flexible deformations in order to register the image to another image. Non-linear transformations may, according to some examples, be defined using vector fields such as warp fields, or other fields or functions, defining an individual displacement for each pixel/voxel in an image. For more detailed information about image registration, reference is made to US 2011/0 081 066 and US 2012/0 235 679. Rigid image registration is very effective in cases when no deformations are expected. In comparison to rigid image registration, non-rigid image registration has a significantly greater flexibility as non-rigid image registrations can manage local distortions between two image sets but can be more complex to handle.

According to some examples, the step of generating the second segmentation comprises transforming the annotation into the coordinate system of the first registration (or vice versa) using the image registration, and generating the second registration by combining the first registration with the transformed annotation (or vice versa).

Using image registration techniques upon generating the second registration has the advantage that the first and second abnormality image can be transformed into a common coordinate system. With that, it can be ensured that the segmented structures have the same scale and the same location in the image data. In turn, segmentation masks can be more readily compared and artefacts in the calculation of the second segmentation are avoided.

According to an aspect, the step of generating the second segmentation comprises: (mathematically) sectioning the first segmentation with the annotation, and/or correcting (or refining) the first segmentation by applying the annotation to the first segmentation.

According to some examples, the steps of sectioning and/or correcting (or refining) may be based on the image registration. Further, the steps of sectioning and/or correcting (or refining) may be based on the annotation transformed into the coordinate system of the first segmentation based on the image registration.

According to an aspect, the step of obtaining the first segmentation comprises: providing an initial segmentation algorithm different than the segmentation algorithm to be trained with the training data set, the initial segmentation algorithm being configured to segment a whole-slide image depicting tissue of multiple types for the plurality of different tissue types at the first level of detail, and applying the initial segmentation algorithm to the whole slide image so as to generate the first segmentation.

In other words, a "coarse" segmentation algorithm operating on the first level of detail is used for generating the first segmentation. Albeit the general architecture of such segmentation algorithm may in principle be of the same kind as the final ML segmentation algorithm, the "coarse" segmentation algorithm may be trained relatively easily as it does not require detailed annotations. At the same time, such coarse segmentation algorithm may be completely independent from the final ML segmentation algorithm as the training data and process are conceived so as to provide a stand-alone ML-segmentation algorithm.

According to an aspect, a computer-implemented method for providing a trained segmentation algorithm in digital pathology for segmenting a whole-slide images depicting a tissue of multiple tissue types in accordance with a plurality of different tissue types is provided. The method comprises a plurality of steps. A first step is directed to provide a training data set according to any one of the aspects herein described. A further step is directed to provide a ML segmentation algorithm for segmenting a whole-slide image depicting a tissue of multiple tissue types in accordance with a plurality of different tissue types. A further step is directed to train the ML segmentation algorithm based on the training data set so as to obtain a trained segmentation algorithm. A further step is directed to provide the trained ML segmentation algorithm.

The ML segmentation algorithm may be completely untrained or pre-trained to receive further training. The training data comprises a whole-slide image and a corresponding second segmentation as ground truth. Training may involve inputting the whole-slide image into the ML segmentation algorithm so as to obtain a training segmentation, comparing the training segmentation with the second segmentation, and adjusting the ML segmentation algorithm based on the comparison. In particular, this may involve minimizing a loss function which loss function is based on the second segmentation.

According to an aspect, a computer-implemented method for segmenting a whole-slide image depicting tissue of multiple types in accordance with a plurality of different tissue types is provided. The method comprises a plurality of steps. A first step is directed to provide a trained segmentation algorithm according to any one of the aspects herein described. A further step is directed to provide the whole slide image. A further step is directed to apply the trained segmentation algorithm to the whole slide image so as to segment the whole-slide image in accordance with a plurality of different tissue types.

According to an aspect, computer program product is provided which comprises program elements which induce a computing unit of a system to perform the steps according to one or more of the above method aspects, when the program elements are loaded into a memory of the computing unit.

According to another aspect, a computer-readable medium is provided on which program elements are stored that are readable and executable by a computing unit of a system to perform the steps according to one or more of the above method aspects, when the program elements are executed by the computing unit.

The realization of one or more example embodiments of the present invention by a computer program product and/or a computer-readable medium has the advantage that already existing providing systems can be easily adapted by software updates in order to work as proposed by one or more example embodiments of the present invention.

The computer program product can be, for example, a computer program or comprise another element next to the computer program as such. This other element can be hardware, e.g., a memory device, on which the computer program is stored, a hardware key for using the computer program and the like, and/or software, e.g., a documentation or a software key for using the computer program. The computer program product may further comprise development material, a runtime system and/or databases or libraries. The computer program product may be distributed among several computer instances.

One or more example embodiments of the present invention covers the use of a trained segmentation algorithm provided according to any one of the aspects herein described for segmenting a whole-slide image depicting tissue of multiple types in accordance with a plurality of different tissue types.

According to an aspect, a system for providing a training data set for training a segmentation algorithm for segmenting a whole-slide image depicting a tissue of multiple tissue types in accordance with a plurality of different tissue types is provided. The system comprises an interface unit and a computing unit. The interface unit is configured to receive a whole-slide image depicting a tissue slice (of a patient). The computing unit is configured to obtain (calculate) a first segmentation of the whole-slide image and for the plurality of different tissue types, the first segmentation having a first level of detail. The computing unit is further configured to obtain (calculate) an annotation of the tissue slice, the annotation having a level of detail greater than the first level of detail. The computing unit is further configured to generate (calculate) a second segmentation of the whole-slide image and for the plurality of different tissue types based on the first segmentation and the annotation, the second segmentation having a level of detail greater than the first level of detail. The computing unit is further configured to provide the training data set comprising the whole-slide image and the second segmentation (via the interface unit).

According to an aspect, a system for providing a trained segmentation algorithm in digital pathology for segmenting whole-slide images depicting a tissue of multiple tissue types in accordance with a plurality of different tissue types is provided. The system comprises an interface unit and a computing unit. The interface unit is configured to receive a training data set provided according to any one of the aspects herein described and a ML segmentation algorithm for segmenting whole-slide images depicting a tissue of multiple tissue types in accordance with a plurality of different tissue types. The computing unit is directed to train the ML segmentation algorithm based on the training data set so as to obtain a trained segmentation algorithm. The computing unit is directed to provide the trained segmentation algorithm (via the interface unit).

According to an aspect, a system for segmenting a whole-slide image depicting tissue of multiple types in accordance with a plurality of different tissue types is provided. The system comprises an interface unit and a computing unit. The interface unit is configured to receive a trained segmentation algorithm according to any one of the aspects herein described and the whole-slide image. The computing unit is configured to apply the trained segmentation algorithm to the whole-slide image so as to segment the whole-slide image in accordance with the plurality of different tissue types.

The computing unit may be realized as a data processing system or as a part of a data processing system. Such a data processing system can, for example, comprise a cloud-computing system, a computer network, a computer, a tablet computer, a smartphone and/or the like. The computing unit can comprise hardware and/or software. The hardware can comprise, for example, one or more processor, one or more memories and combinations thereof. The one or more memories may store instructions for carrying out the method steps according to one or more example embodiments of the present invention. The hardware can be configurable by the software and/or be operable by the software. Generally, all units, sub-units or modules may at least temporarily be in data exchange with each other, e.g., via a network connection or respective interfaces. Consequently, individual units may be located apart from each other.

The interface unit may comprise an interface for data exchange with a local server or a central web server via internet connection for receiving the reference image data or follow-up image data. The interface unit may be further adapted to interface with one or more users of the system, e.g., by displaying the result of the processing by the computing unit to the user (e.g., in a graphical user interface) or by allowing the user to adjust parameters for image processing or visualization, for making annotation or aligning image data, and/or to select whole-slide images for processing.

One or more example embodiments of the present invention further relates to a digital pathology image analysis system comprising at least one of the above systems and a digital pathology image system (or digital pathology information system) configured to acquire, store and/or forward whole-slide images. Thereby, the interface unit is configured to receive whole-slide images form the digital pathology image system.

According to some examples, the digital pathology image system comprises one or more archive stations for storing whole-slide images which may be realized as a cloud storage or as a local or spread storage. Further, the digital pathology image system may comprise one or more imaging modalities, such as a slide scanning apparatus or the like.

According to other aspects, the systems are adapted to implement the inventive method in their various aspects for providing training data, for providing a ML segmentation algorithm, or for segmenting a whole-slide image. The advantages described in connection with the method aspects may also be realized by the correspondingly configured systems' components.

FIG. 1 schematically depicts a system 91 according to various examples. The system 91 includes a processor 92 (computing unit) that is coupled to a memory 93. The processor 92 can load program code from the memory 93. The processor 92 can execute the program code. The processor 92 can also communicate with other devices and/or databases via an interface 94 (interface unit). For instance, the processor 92 could receive a whole-slide image WSI1, WSI2 via the interface 94 for subsequent processing of the whole-slide image WSI1, WSI2. The processor 92 could output a sematic information associated with the whole-slide image WSI1, WSI2 and obtained from said processing of the whole-slide image WSI1, WSI2 via the interface 94. The semantic information could, e.g., include a segmentation result of a ML segmentation algorithm that has been previously trained. Based on such segmentation result, tumor-type tissue could be detected in a whole-slide image WSI1, WSI2.

Further, processor 92 may receive a complementary whole-slide image WSI2 via interface 94 for subsequent processing of the complementary whole-slide image WSI2. Processor may be configured to output an annotation A associated with the complementary whole-slide image WSI2.

The processor 92, upon loading and executing the program code, could perform techniques as described herein, e.g.: training of an ML algorithm; performing an annotation process for determining annotations of a whole-slide image WSI1, WSI2; determining a ground truth for a training of an ML algorithm; refining an annotation; setting parameters of an ML algorithm, e.g., using backpropagation or another training optimization minimizing a loss value of a loss function, etc.

Figure 2:
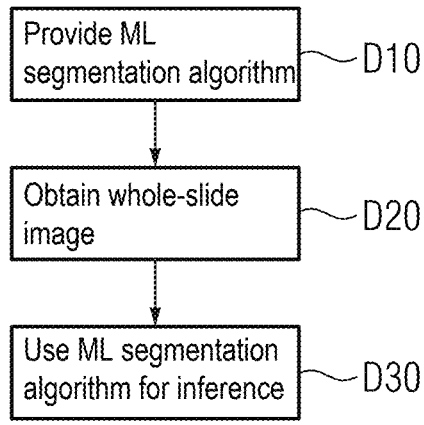
FIG. 2 schematically depicts a method for providing a segmentation of a whole-slide image using a ML segmentation algorithm according to an example embodiment.

FIG. 2 is a flowchart of a method according to various examples. For instance, the method according to FIG. 2 could be executed by a processor upon loading program code from a memory. For example, the method according to FIG. 2 could be executed by the processor 92 of the system 91 upon loading program code from the memory 93 and upon executing the program code.

At step D10, a ML segmentation algorithm for digital pathology is provided. This may include training the ML segmentation algorithm as herein described. In particular, the training may be based on training data generated as herein described.

Input images depicting tissue samples can be processed using the ML segmentation algorithm. The ML segmentation algorithm can receive an input image and process the input image. An example ML algorithm is a neural network algorithm (NN).

As a general rule, the NN includes multiple layers. The input to a first layer is the input image. Each layer can apply one or more mathematical operations on the input values, e.g., convolutions, nonlinear excitations, pooling operations, to give just a few examples. The input to a layer can be formed by the output of a preceding layer (feed-forward). Feedback of values or skip-connection skipping layers are possible.

The NN for digital pathology can infer at least one semantic histopathology feature. The at least one semantic histopathology feature can describe whether the tissues sample is a manifestation of a disease. It would be possible to segment tissue in an input image, according to various types. Healthy and/or unhealthy tissue may be detected and specifically localized. It would be possible to rate an organ fitness of an organ anatomy in view of tumor growth. A tumor may be graded in accordance with a predefined scale, e.g., to determine a severity. Example semantic histopathology features that could be inferred can be selected from the group consisting of: Gleason scoring, cancer grade/cancer stage estimation, clinical pathway prediction, sub-tumor classification, metastasis evaluation, microsatellite instability (MSI) or stability. For example, a cancer grade can be in accordance with a predefined grading system/scale. Examples would include the Bloom-Richardson score or TNM classification of malignant tumors. Classification systems are available for brain tumors, breast tumors, prostate cancer (Gleason scoring), and other kind of tumors.

The input image received by the ML segmentation algorithm could have a size of at least 4.000×4.000 pixels, or at least 10.000×10.000 pixels, or at least 1E6×1E6 pixels. The input image could be a whole-slide image WSI1, WSI2. The input image could be acquired using optical microscopy. The tissue slice for which the input image is acquired can be stained using a chemical stain. Illumination can be used to generate a respective contrast.

Various examples disclosed herein are described in the practical example of an ML segmentation algorithm that segments a whole-slide image (ML segmentation algorithm). This means that image regions of the whole-slide image that include tissue of a certain type are delimited by a respective segmentation mask defining the segments. Multiple segments can be determined. Different segments can be associated with tissue of different types.

Different implementations of such types of tissue to be detected by the ML algorithm are conceivable. For instance, the ML algorithm may segment a whole-slide image WSI1 to distinguish between a type "cancerous" and another type of non-cancerous" tissue. Other examples are possible. For instance, it would be possible to segment a whole-slide image to determine tissue that is infiltrated by immune cells, as a respective type. It would be possible to segment sections of the whole-slide image that do not show tissue altogether, i.e., "no tissue" segments. The particular types of the tissue to be distinguished by the ML algorithm depend on the training of the ML segmentation algorithm.

In particular, the ML segmentation algorithm may be implemented as a classification algorithm configured to classify image regions, e.g., patches, of WSIs in accordance with the types indicated by the image data. In particular, the segmentation algorithm may be configured to classify cells depicted in the whole-slide images WSI1, WSI2 in accordance with different types as indicated by the WSI image data of these cells. Accordingly, the level of detail the segmentation algorithm is supposed to deliver according to some examples is at least the cell level. In other words, the segmentation provided by the segmentation algorithm discriminates between cells depicted in the whole-slide images WSI1, WSI2 in accordance with different types. According to some examples, the segmentation thus provided segments individual cells.

It would be possible to employ a CNN as segmentation algorithm. For instance, ResNet-18 may be used, see Ayyachamy, Swarnambiga, et al. "Medical image retrieval using Resnet-18." Medical Imaging 2019: Imaging Informatics for Healthcare, Research, and Applications. Vol. 10954. International Society for Optics and Photonics, 2019. A VGG-16 or VGG-19 CNN could be used, see: Mateen, Muhammad, et al. "Fundus image classification using VGG-19 architecture with PCA and SVD." Symmetry 11.1 (2019): 1; or Kaur, Taranjit, and Tapan Kumar Gandhi. "Automated brain image classification based on VGG-16 and transfer learning." 2019 International Conference on Information Technology (ICIT). IEEE, 2019.

Typically, in such architectures of a CNN, a fully connected layer is the output layer, preceded by a pooling layer. The pooling layer is preceded by multiple convolutional layers. There may be skip connections.

Figure 4:
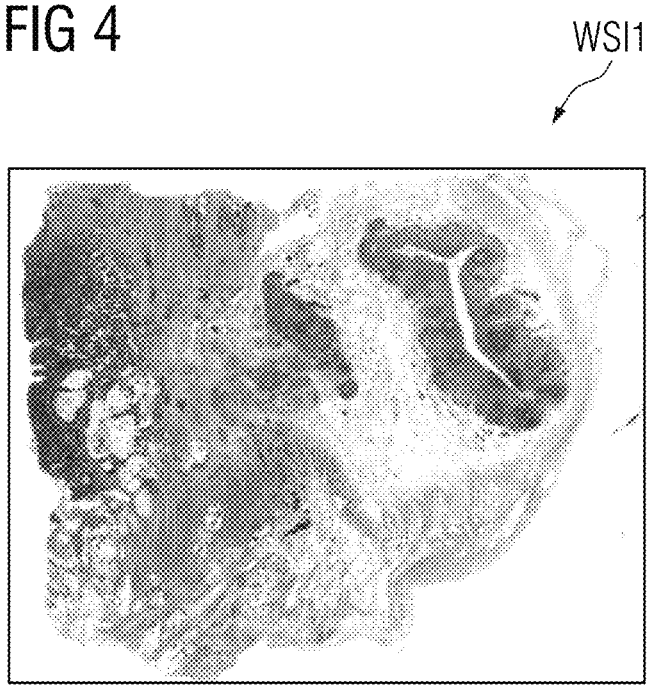
FIG. 4 schematically depicts a whole slide image according to an embodiment.

At step D20, a whole-slide image WSI1 is obtained (c.f. FIG. 4). For example, the whole-slide image WSI1 may be loaded from a picture archiving system or another database. The whole-slide image WSI1 may be acquired using a microscope, e.g., in a laboratory process. The whole-slide image WSI1 may be acquired using various imaging modalities, e.g., fluorescence of stained tissue samples or tissue slides, etc. In particular, the whole-slide image WSI1 obtained depicts a tissue slice stained with a H&E stain.

At step D30, the trained ML segmentation algorithm is used for inference tasks as part of a digital pathology workflow. This means that the whole-slide image WSI1 may be input to the ML segmentation algorithm to thereby obtain segmentation results. Based on these segmentation results, it would be possible to detect tumor-type tissue in the whole-slide image WSI1.

Figure 3:
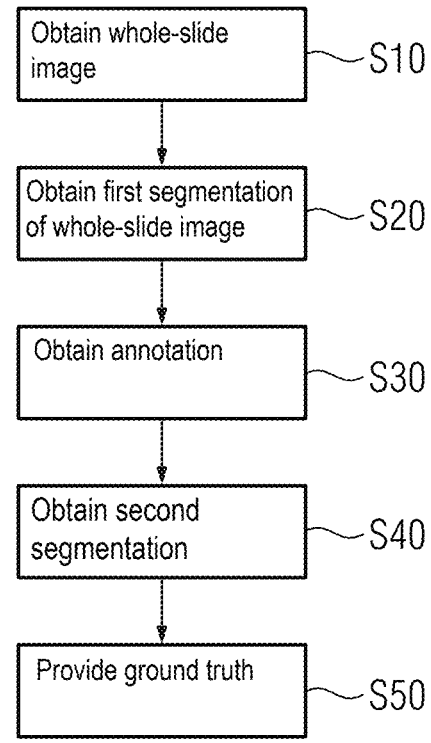
FIG. 3 schematically depicts a method for providing a segmentation of a whole-slide image and/or training data for training a ML segmentation algorithm according to an example embodiment.

FIG. 3 depicts a method for providing a segmentation SEG2 of a WSI. The segmentation SEG2 is to be used as a reference or ground truth for the training of a ML segmentation algorithm. Accordingly, the method of FIG. 3 may also be conceived as a method for providing a training data set for training a ML segmentation function to segment whole-slide images WSI1 according to multiple tissue types. The method comprises several steps. The order of the steps does not necessarily correspond to the numbering of the steps but may also vary between different embodiments of the present invention. Further, individual steps or a sequence of steps may be repeated. Corresponding WSIs are shown in FIGS. 4 to 7. Additional optional sub-steps according to further embodiments are shown in FIGS. 8 to 13. For instance, the method according to FIG. 3 and its sub-steps could be executed by a processor upon loading program code from a memory. For example, the method according to FIG. 3 could be executed by the processor 92 of the system 91 upon loading program code from the memory 93 and upon executing the program code.

At step S10, a whole-slide image WSI1 is obtained. The whole-slide image WSI1 depicts a tissue slice from a tissue sample of a patient. The whole-slide image WSI1 depicts the tissue slice stained with a first histopathological stain. In particular, the first histopathological stain may be a hematoxylin and eosin stain (H&E stain). H&E is the combination of two histological stains: hematoxylin and eosin. Thereby, the hematoxylin stains cell nuclei (in a purplish blue), and the eosin stains the extracellular matrix and cytoplasm (in pink), with other structures taking on different shades, hues, and combinations of these colors (c.f., FIG. 4). In this regard, H&E is the most widely used histopathological stain in digital pathology and often the first or standard stain ordered for histopathological analysis. The whole-slide image WSI1 may essentially be acquired as described in connection with step D20.

Figure 5:
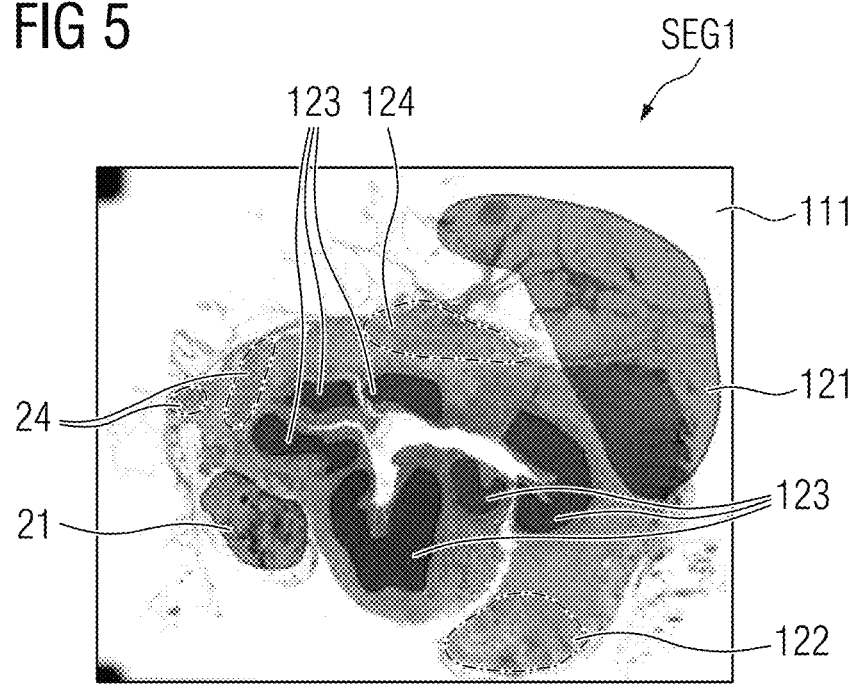
FIG. 5 schematically depicts a segmentation of a whole-slide image according to an embodiment.
Figure 6:
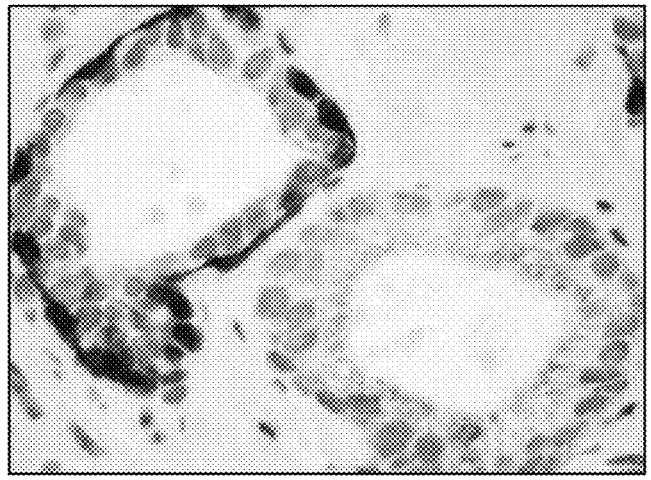
FIG. 6 schematically depicts a whole slide image according to a further embodiment.
Figure 7:
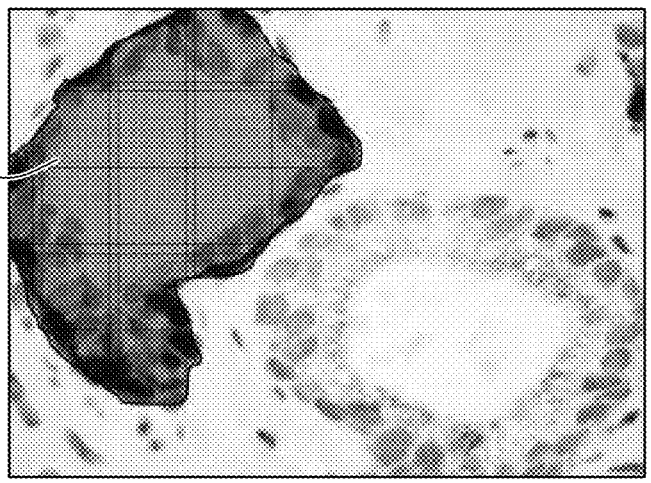
FIG. 7 schematically depicts a segmentation of a whole-slide image according to a further embodiment.

At step S20 a first or initial segmentation SEG1 of at least part of the whole-slide image WSI1 is obtained. As shown in FIG. 5, the initial segmentation SEG1 may include one or more labels 121-124 for different types of tissue for the whole-slide image WSI1 of FIG. 4. The initial segmentation may be according to multiple tissue types, i.e., may define labels for each type. The labels can pertain to regions that are delineated by polylines. According to some examples, the initial segmentation SEG1 only covers a fraction of the overall whole-slide image WSI1. Further, the initial segmentation SEG1 may be a binary segmentation segmenting a whole-slide image WSI1 according to two different tissue types or features.

The initial segmentation SEG1 has a first level of detail. The first level of detail may pertain to a certain accuracy with which the initial segmentation SEG1 is determined. For instance, the initial level of detail may specify a spatial resolution of boundaries of regions associated with a common label. For instance, these boundaries may not be specified with a resolution on pixel level. The first level of detail may resolve labels of the initial segmentation SEG1 on a certain spatial resolution which may be coarser than a pixel-accurate resolution.

Specifically, the initial segmentation SEG1 may identify various regions in the whole-slide image WSI1 (c.f., FIG. 5). In particular, the initial segmentation SEG1 may identify various regions in the WSI based on a first set of labels 121-124. Accordingly, regions in the whole-slide image WSI1 may be associated with a respective label 121-124. Each label 121-124 may be indicative of a given type of the tissue. For instance, each label may be indicative of a majority type of the tissue in that region. There may be minority types of tissue also present in the respective region, at least to some certain extent. Specifically, the initial level of detail may allow for a certain quota for certain small-sized tissue fractions or segments (i.e., pieces of tissue) of deviating type, i.e., minority types within an area of the region that is associated with a majority type. According to some examples, the first level of detail may be a super-pixel resolution. This may mean that the region identified in the initial segmentation SEG1 are not accurate on pixel-level.

According to some examples, the initial segmentation SEG1 may be obtained from an annotation process that interacts with a user. According to other examples, the initial segmentation SEG1 may be obtained by inputting the whole-slide image WSI1 into an "initial" ML segmentation algorithm as described above. This initial segmentation algorithm may have been trained to process WSIs (in particular H&E stained WSIs) so as to provide a segmentation in a first level of detail. Accordingly, such segmentation algorithm may be denoted as initial ML segmentation algorithm.

At step S30, an annotation A is obtained. The annotation A, according to some examples, is at least in parts complementary to the initial segmentation SEG1. This may mean that the annotation A is not based on the multiple types the initial segmentation SEG1 is based on. Rather, the annotation A may be an annotation according to types different than the multiple types. Accordingly, the annotation A may be based on a second set of labels 125 different than the first set of labels of the initial segmentation SEG1. The annotation A may be directed to a part of the whole-slide image WSI1 which at least partially overlaps with the initial segmentation SEG1. Further, the annotation A may be a binary segmentation segmenting a whole-slide image according to two different tissue types or features.

The annotation A may have a second level of detail which is greater than the first level of detail. In particular, the second level of detail may resolve labels of the annotation on a resolution greater than the initial segmentation SEG1—in particular, the resolution of the second level of detail may be pixel-accurate. Moreover, second level of detail which is greater than the first level of detail may mean that a quota for certain small-sized tissue fractions or segments (i.e., pieces of tissue) of deviating type, i.e., minority types within an area of the region that is associated with a majority type, is smaller as compared to the initial segmentation SEG1.

There are various ways of how such an annotation A can be provided. In particular, such an annotation A may be provided by processing a complementary whole-slide image WSI2 to the whole-slide image WSI1 which comprises complementary image information as compared to the whole-slide image WSI1. Corresponding steps are shown in FIG. 8.

Figure 8:
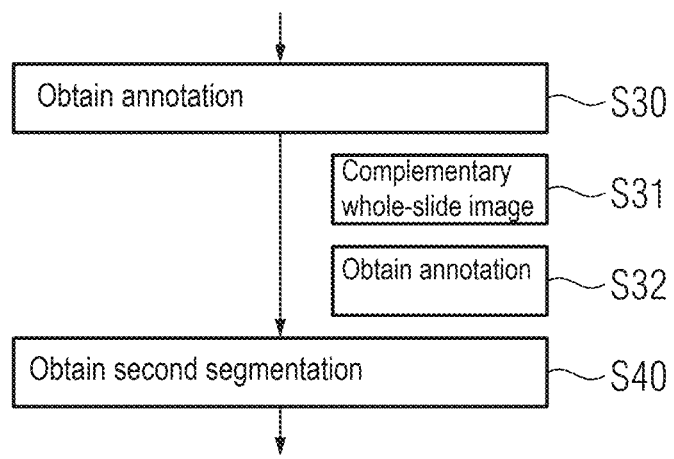
FIG. 8 schematically depicts method steps for providing a whole-slide image according to an embodiment.
Figure 9:
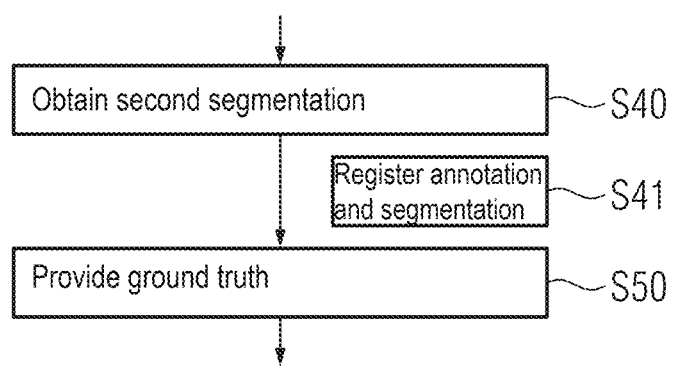
FIG. 9 schematically depicts method steps for providing a segmentation of a whole slide image according to an embodiment.
Figure 10:
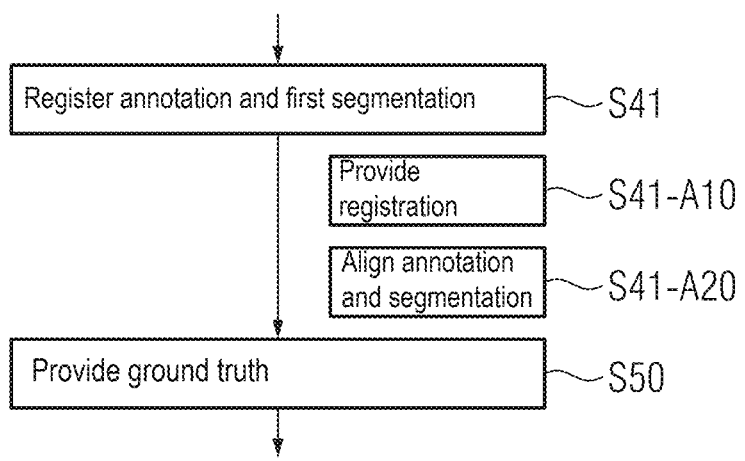
FIG. 10 schematically depicts method steps for providing a segmentation of a whole slide image according to an embodiment.

Specifically, FIG. 8 schematically shows a plurality of optional sub-steps of step S30. The order of the steps does not necessarily correspond to the numbering of the steps but may also vary between different embodiments of the present invention. Further, individual steps may be left out and individual steps or a sequence of steps may be repeated.

At a first option sub-step S31, a complementary whole-slide image WSI2 is obtained. The complementary whole-slide image WSI2 shows the same tissue slice as the whole-slide image WSI1 or at least a related tissue slice as compared to the whole-slide image WSI1. However, the tissue slice depicted in the complementary whole-slide image WSI2 is stained with a second or complementary histopathological stain different than the first histopathological stain. In particular, a histopathological stain may be used which is less common in the clinical praxis than the first histopathological stain but which may allow for a more accurate recognition of structures and thus a more accurate assignment of labels in the annotation A. Since the second histopathological stain will highlight at least partially different features in the tissue slice as compared to the first stain, also the labels and tissue types covered by the annotation A may be different as compared to the initial segmentation SEG1.

The second histopathological stain may be an immunohistochemistry stain. In particular, the second histopathological stain may be configured to highlight keratins in tissue slices. Generally speaking, keratin sub-forms build the intermediate filaments that make up the cytoskeleton of basal epithelial cells. A corresponding immunohistochemical stain specifically targeting such keratin structures provides for a very clear optical readout of cellular structures in whole-slide images. Accordingly, a suchlike second histopathological stain may allow for the accurate labeling of cellular structures within cells and/or whole cells and/or cell types at a high resolution. As the variability of the image patterns is low and the labels for the second annotation A may be in principle low-key (no differentiation between tissue types but just the detection of cellular structures required), the annotation A may be provided rather easily at a better resolution than the initial segmentation SEG1.

What is more, the usage of immunohistochemistry stains may also allow for a complementary disease readout as the expression of keratins is often suppressed in cancerous cells as compared to benign structures. In the complementary whole-slide image WSI2 shown in FIGS. 6 and 7 for instance, label 125 would correspond to a benign region.

There are different options for the second histopathological stain. For instance, the second histopathological stain may comprise biomarkers targeting p63, CK-5, CK-8, CK-18, CK-14, AMACR and combinations thereof, wherein p63 relates to the so-called "tumor protein", CK- . . . relate to different cytokeratin forms, and AMACR stands for the human enzyme Alpha-methylacyl-CoA racemase. In particular, mixtures of p63, cytokeratin and AMACR biomarkers may be used to specifically label adenocarcinoma, such as the so-called PIN-4 cocktail, targeting p63, CK-5, CK-14 and AMACR.

At a second optional sub-step S32, the annotation A is obtained based on the complementary whole-slide image WSI2. According to some examples, the annotation A may be obtained by applying a threshold to the complementary whole-slide image WSI2 which may be configured to filter for image data corresponding to structures depicted in the complementary whole-slide image WSI2 targeted by the second histopathological stain and/or or regions of the complementary whole-slide image WSI2 lacking staining with the second histopathological stain. In particular, the thresholding may be applied to individual pixel or color values of the pixels comprised in the complementary whole-slide image WSI2. In this regard thresholding may mean discriminating between different color or brightness values. For instance, all pixels having a value above a certain threshold may be identified as belonging to a certain type of structures and attributed a corresponding label according to the annotation A.

According to alternative examples, the annotation A may be obtained by a yet another ML segmentation algorithm configured to annotate a complementary whole-slide image WSI2 according to the set of labels 125 of the annotation A. Since such ML segmentation algorithm is specifically adapted to recognize types highlighted with the second histopathological stain, it may be referred to as ML IHC segmentation algorithm. The ML IHC segmentation algorithm may essentially be of the form of the general ML segmentation algorithms as described above.

According to further examples, obtaining the annotation A may involve extracting, at the second level of detail, features from the complementary whole-slide image WSI2. As explained above, the features may relate to one or more cellular features depicted in the complementary whole-slide image WSI2 and highlighted by the second histopathological stain. The annotation A may then be based on the extracted features. In particular, feature extraction may be performed by the ML IHC segmentation algorithm.

Generally, the annotation A may provide regions positively highlighted by the second histopathological stain at the second level of detail. Thereby, the second level of detail may be pixel accurate. Further, the regions may be keratin-positive cell walls. Further, the regions may relate to adenocarcinoma.

At step S40, a second segmentation SEG2 is obtained based on the first segmentation SEG1 and the annotation A. Specifically, the annotation A may be applied to or merged with the first segmentation SEG1 so as to generate the second segmentation SEG2. Since the annotation A has a higher level of detail than the first segmentation SEG1, it is possible to improve or refine the first segmentation SEG1 at least such that the resulting second segmentation SEG2 has a greater level of detail than the first segmentation SEG1. In optimal implementations, the level of detail of the second segmentation SEG2 may be at least equivalent to the level of detail of the annotation A.

According to some examples, generating the second segmentation SEG2 based on the first segmentation SEG1 and the annotation A may comprise applying the annotation A on the first segmentation SEG1 and adjust (i.e., remove or add) those parts of the first segmentation SEG1 that are not reflected in the annotation A. If the annotation A comprises pixel-accurate regions, the pixels of labeled regions of the first segmentation SEG1 not corresponding to the annotation A can be added or removed.

In order to improve the accuracy of the second segmentation SEG2, the annotation A and the first segmentation SEG1 may be aligned or registered with one another upon generating the second segmentation SEG2. This may be carried out in optional step S41. Specifically, this may involve providing a registration between the first segmentation SEG1 and the annotation A at further optional sub-step S41-A10 and aligning the first segmentation SEG1 and the annotation A based on the registration in further optional sub-step S41-A20.

Generally, providing a registration at step S41-A10 may mean identifying corresponding data points in the first segmentation SEG1 and the annotation A. Having identified such corresponding data points, it is possible to calculate the local offset between these corresponding points which provides an indication of the local shift in coordinate systems between the first segmentation SEG1 and the annotation A. Doing this for a plurality of corresponding data points sufficiently distributed in the first segmentation SEG1 and the annotation A already provides a good indication of the displacements and deformations between the respective image data. To appropriately aggregate these individual contributions into a coherent two or three-dimensional transformation function or deformation field, various registration techniques may be used. These techniques may comprise rigid registrations, affine registrations, non-rigid registrations, non-affine registrations and any combination thereof.

According to some examples, the registration may be provided on the basis of the whole-slide image WSI1 and the complementary whole-slide image WSI2, i.e., the whole-slide image WSI1 and the complementary whole-slide image WSI2 may be registered with one another. Suchlike image-based registration may yield better results as a registration based on segmentation and annotation masks as the matching of image data may be less ambiguous due to more context for each data point matched. Accordingly, the transformation function found for transforming the coordinate system of the complementary whole-slide image WSI2 into the coordinate system of the whole-slide image WSI1 (or vice versa) is equally applicable for transforming the annotation A into the coordinate system of the first segmentation SEG1 (or vice versa).

Aligning the first segmentation SEG1 and the annotation A at step S41-A20 may involve transforming the annotation A into the coordinate system of the first segmentation SEG1 (or vice versa) using the transformation function determined at step S41-A10. The second segmentation SEG2 may then be determined by applying the thus transformed annotation A to the first segmentation SEG1.

With the second segmentation SEG2, a ground truth for training a ML segmentation algorithm may be provided at step S50 that has a better quality than the first segmentation SEG1. Accordingly, a corresponding training data set comprises the whole-slide image WSI1 and the second segmentation SEG2. Specifically, the second segmentation SEG is obtained via the detour of providing and evaluating a complementary whole-slide image WSI2 for each whole-slide image WSI1 (which will not be the case during deployment of the ML segmentation algorithm).

There are several options for providing the complementary whole-slide image WSI2, three of which will be explained in more detail with reference to FIGS. 11 to 13.

Figure 11:
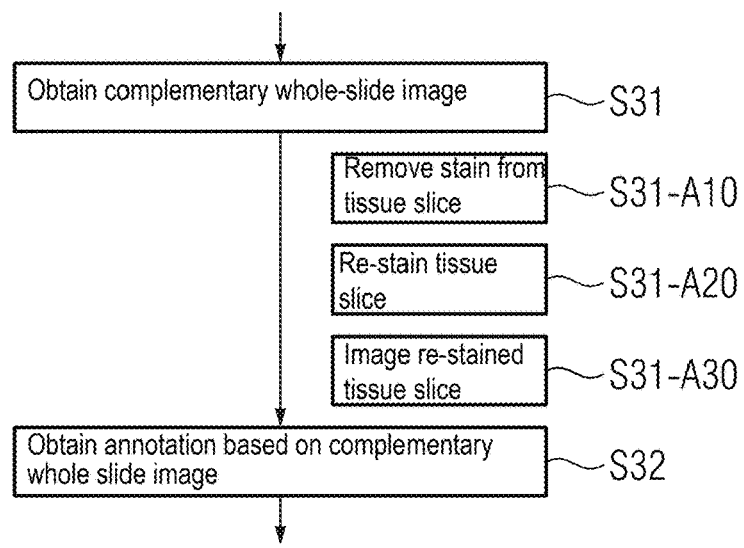
FIG. 11 schematically depicts method steps for providing a whole-slide image according to an embodiment.

In the example shown in FIG. 11, the tissue slice depicted in the whole-slide image WSI1 is reused for obtaining the complementary whole-slide image WSI2. Specifically, at step S31-A10, the first histopathological stain is removed from the tissue slice. This may be carried out by washing or rinsing the tissue slice with an appropriate solvent. At a next step S31-A20, the washed tissue slice may be re-stained with the second histopathological stain the usual way. That followed, at step S31-A30, the re-stained tissue slice may be imaged, e.g., with a slide scanning apparatus, essentially as described above.

Figure 12:
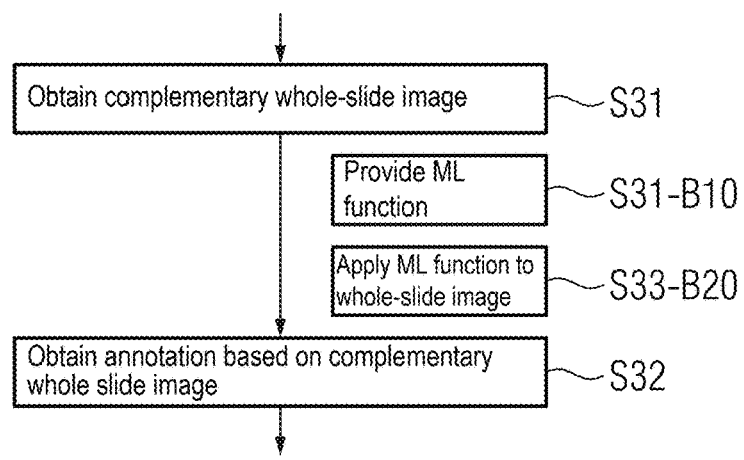
FIG. 12 schematically depicts method steps for providing a whole-slide image according to an embodiment.

In the example shown in FIG. 12, an appearance of the complementary whole-slide image WSI2 is "simulated" based on the whole-slide image WSI1. To this end, a machine-learned image processing function may provided at step S31-B10 which has been trained to simulate or predict image data depicting a tissue slice stained with the second histopathological stain based on image data of the tissue slice stained with the first histopathological stain. In other words, the ML image processing function has been trained to transfer the "style" of the tissue slice obtained with the first histopathological stain to a style the tissue slice likely would have if stained with the second histopathological stain. At step S31-B20, the ML image processing function is applied to the whole-slide image WSI1 so as to generate the corresponding complementary whole-slide image WSI2.

According to some examples, the ML image processing function may be a deep convolutional neural network. In one example, a fully convolutional, image-to-image neural network may be used in which the whole-slide image WSI1 is input into the network, and the output is the complementary whole-slide image WSI2. The ML image processing function may be trained based on corresponding pairs of whole-slide images WSI1 and "real" complementary whole-slide images WSI2 which may, e.g., provided in the same way as described in connection with FIG. 11 or FIG. 13.

According to some examples, the ML image processing network may be an adversarial network, a deep adversarial network and/or a generative adversarial network. A generative adversarial network or function comprises a generator part or function and a classifier or discriminator part or function. According to some examples, the generator creates a complementary whole-slide image WSI2 image from the whole-slide image WSI1 and the discriminator distinguishes between synthetically created complementary whole-slide images WSI2 and real complementary whole slide images WSI2. The training of the generator and/or of the discriminator is based, in particular, on the minimization of a cost function in each case. The cost function can be minimized, in particular, by back propagation. If the generator and the discriminator are given by a network, in particular by an artificial neural network, then the generative adversarial (or short "GA") algorithm is also referred to as GA networks (also "GAN", which is an acronym for "generative adversarial networks". These are known in particular from the publication by Ian J. Goodfellow, "Generative Adversarial Networks", arxiv 1406.2661 (2014).

Figure 13:
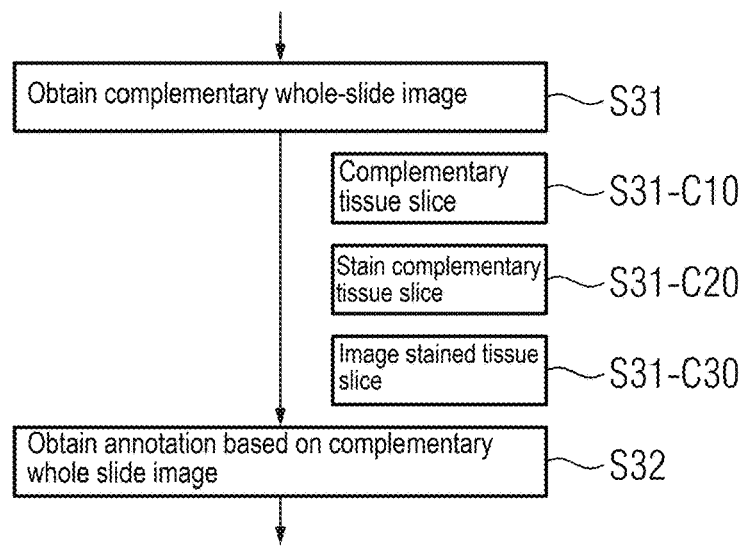
FIG. 13 schematically depicts method steps for providing a whole-slide image according to an embodiment.

According to the implementation shown in FIG. 13, the complementary whole-slide image WSI2 is provided based on a complementary tissue slice (step S31-C10). The complementary tissue slice may be a proximal or neighboring and, in particular, a consecutive tissue slice with respect to the tissue slice depicted in the whole-slide image WSI1. At step S31-C20, the complementary tissue slice is stained with the second histopathological stain. That followed, at step S31-C30, the re-stained tissue slice may be imaged, e.g., with a slide scanning apparatus, essentially as described above.

Figure 14:
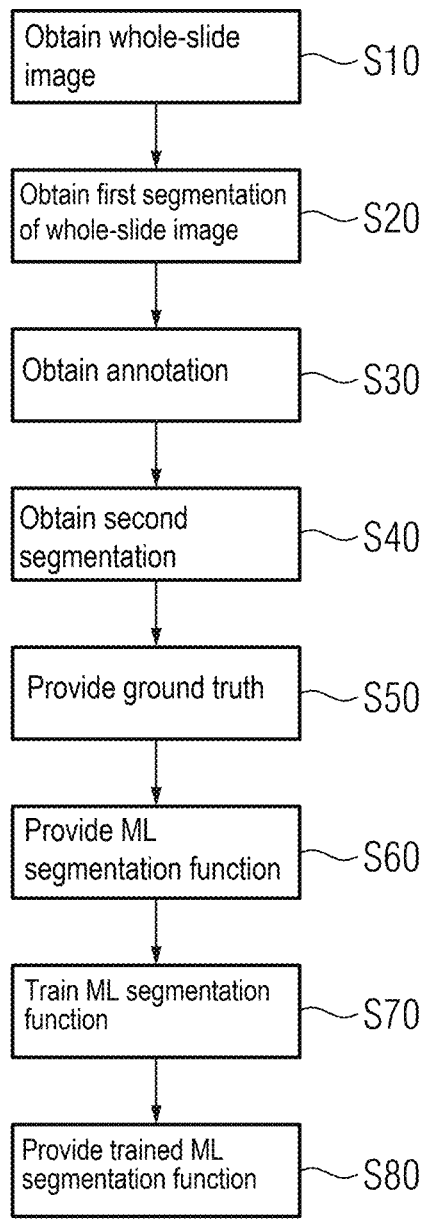
FIG. 14 schematically depicts a method for training a ML segmentation algorithm for segmenting a whole-slide image according to multiple tissue types according to an embodiment.

FIG. 14 shows a method for providing a trained ML segmentation algorithm according to an embodiment. The method comprises several steps. The order of the steps does not necessarily correspond to the numbering of the steps but may also vary between different embodiments of the present invention. Further, individual steps or a sequence of steps may be repeated. Steps denoted with identical reference numerals as compared to FIGS. 3 and 8 to 11 are identical to the steps described in connection with FIGS. 3 and 8 to 11 facultatively including any of the described sub-steps. For instance, the method according to FIG. 14 and its sub-steps could be executed by a processor upon loading program code from a memory. For example, the method according to FIG. 14 could be executed by the processor 92 of the system 91 upon loading program code from the memory 93 and upon executing the program code.

Following the provision of the second segmentation SEG2 at step S50 and the provision of the (not readily trained) ML segmentation algorithm at step S60, the second segmentation may be used in step S70 to (further) train the ML segmentation function. Specifically, the second segmentation SEG2 may be used as ground truth for judging the performance of the ML segmentation algorithm. At step S80, the thus optimized ML segmentation algorithm is provided for deployment.

The ML segmentation algorithm according to some examples may be different than the initial ML segmentation algorithm with which the first segmentation SEG1 may have been obtained. This has the advantage that the ML segmentation algorithm can be optimized for the higher level of detail and that crosstalk between the different segmentations and their generation is avoided.

Figure 15:
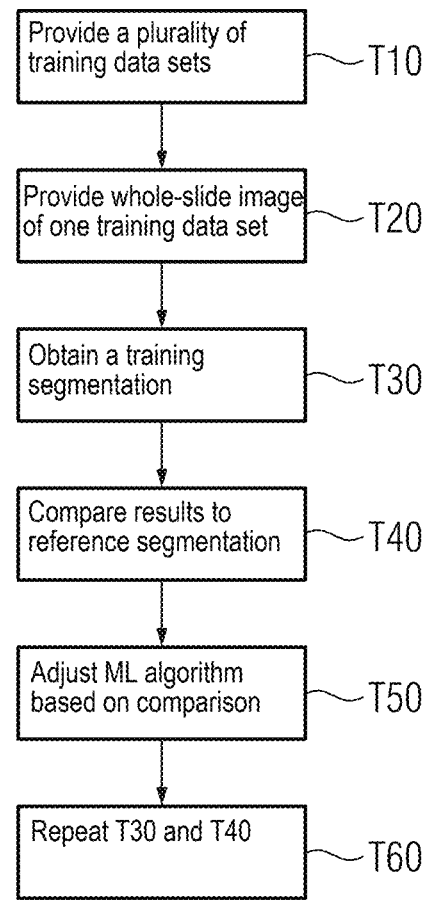
FIG. 15 schematically depicts a method for training a ML segmentation algorithm for segmenting a whole-slide image according to multiple tissue types according to an embodiment.

In FIG. 15, a method for providing a ML segmentation algorithm is schematically shown. The order of the steps does not necessarily correspond to the numbering of the steps but may also vary between different embodiments of the present invention. Further, individual steps or a sequence of steps may be repeated. For instance, the method according to FIG. 15 and its sub-steps could be executed by a processor upon loading program code from a memory. For example, the method according to FIG. 15 could be executed by the processor 92 of the system 91 upon loading program code from the memory 93 and upon executing the program code.

A first step T10 is directed to provide a plurality of training data sets. The training data sets respectively comprise a whole slide image WSI1 and a corresponding reference segmentation SEG2. The reference segmentation SEG2 is of the type of the second segmentation SEG2 and may be obtained essentially as described in connection with FIGS. 3 to 11.

Next, at step T20, the whole-slide image WSI1 of one training data set is provided to the (not readily trained) ML segmentation algorithm.

Based on the whole-slide image WSI1, the ML segmentation algorithm will determine a training segmentation of the whole-slide image WSI1 according to the learned task in step T30. In particular, the training segmentation of the whole-slide image WSI1 may be a segmentation according to multiple tissue types depicted in the whole-slide image WSI1.

The performance of the ML segmentation algorithm (i.e., the quality of the segmentation) is evaluated in subsequent step T40 based on a comparison of the reference segmentation and the training segmentation. One way of implementing this would be comparing the reference segmentation with the training segmentation (e.g., on a pixel-by-pixel basis relative to the whole-slide image WSI1).

The comparison is used as a loss function to adjust weights of the ML segmentation algorithm at step T50.

At step T60 the steps of obtaining a training segmentation (step T30) and comparing the result to the reference segmentation (step T40) are repeated with paired sets of whole slide images WSI1 and reference segmentations SEG2 until the ML segmentation algorithm is able to generate results that are acceptable (i.e., until a local minimum of the loss function is reached). Once all pairs have been used, pairs are randomly shuffled for the next pass.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium, storage means or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Wherever meaningful, individual embodiments or their individual aspects and features can be combined or exchanged with one another without limiting or widening the scope of the present invention. Advantages which are described with respect to one embodiment of the present invention are, wherever applicable, also advantageous to other embodiments of the present invention.

The invention claimed is:

1. A computer-implemented method for providing a training data set for training a segmentation algorithm, the method comprising:
    obtaining a whole-slide image depicting a tissue slice;
    obtaining a first segmentation of the whole-slide image and for a plurality of different tissue types, the first segmentation having a first level of detail;
    obtaining an annotation of the tissue slice by obtaining a complementary whole-slide image different from the whole-slide image, processing the complementary whole-slide image to extract, at a level of detail greater than the first level of detail, one or more features from the complementary whole-slide image, and segmenting the one or more features to obtain the annotation of the tissue slice, the annotation having a level of detail greater than the first level of detail, the complementary whole-slide image depicting the tissue slice or a proximal tissue slice of the tissue slice, and the one or more features optionally relating to one or more cytoskeleton features of cells depicted in the complementary whole-slide image;
    generating a second segmentation of the whole-slide image and for the plurality of different tissue types based on the first segmentation and the annotation, the second segmentation having a level of detail greater than the first level of detail; and
    providing the training data set, the training set comprising the whole-slide image and the second segmentation.

2. The method of claim 1, wherein
    the whole-slide image depicts the tissue slice stained with a first histopathological stain, and
    the complementary whole-slide image depicts the tissue slice, or the proximal tissue slice stained with a second histopathological stain different than the first histopathological stain.

3. The method of claim 2, wherein at least one of
    the first histopathological stain is a hematoxylin and eosin (H&E) stain, or
    the second histopathological stain is an immunohistochemistry stain.

4. The method of claim 3, wherein the obtaining the complementary whole-slide image comprises:
    obtaining the proximal tissue slice from the same tissue sample as the tissue slice,
    staining the proximal tissue slice with the second histopathological stain, and
    imaging the stained proximal tissue slice to generate the complementary whole-slide image.

5. The method of claim 2, wherein the obtaining the complementary whole-slide image comprises:
    removing the first histopathological stain from the tissue slice,
    staining the tissue slice with the second histopathological stain to generate a re-stained tissue slice, and
    imaging the re-stained tissue slice to generate the complementary whole-slide image.

6. The method of claim 2, wherein the obtaining the complementary whole-slide image comprises:
    providing an image processing function configured to simulate image data depicting a tissue slice stained with the second histopathological stain based on image data of the tissue slice stained with the first histopathological stain, and
    generating the complementary whole-slide image by applying the image processing function on the whole-slide image.

7. The method of claim 2, wherein the obtaining the complementary whole-slide image comprises:
    obtaining the proximal tissue slice from the same tissue sample as the tissue slice,
    staining the proximal tissue slice with the second histopathological stain, and
    imaging the stained proximal tissue slice to generate the complementary whole-slide image.

8. The method of claim 1, wherein the generating the second segmentation comprises:
    at least one of aligning or registering the first segmentation with the annotation.

9. The method of claim 8,
    wherein the at least one of aligning or registering includes,
        obtaining an image registration between the whole-slide image and the complementary whole-slide image, and
        aligning the first segmentation with the annotation based on the image registration.

10. The method of claim 1, wherein the generating the second segmentation comprises at least one of:
    sectioning the first segmentation with the annotation, or
    correcting the first segmentation by applying the annotation to the first segmentation.

11. The method of claim 1, wherein the obtaining the first segmentation comprises:
    providing an initial segmentation algorithm different than the segmentation algorithm to be trained with the training data set, the initial segmentation algorithm being configured to segment the whole-slide image depicting tissue of multiple types for the plurality of different tissue types at the first level of detail, and
    applying the initial segmentation algorithm to the whole-slide image to generate the first segmentation.

12. A computer-implemented method comprising:
    providing a training data set, the training set being provided using the method of claim 1;
    providing a segmentation algorithm for segmenting whole-slide images depicting tissue of multiple tissue types in accordance with a plurality of different tissue types;
    training the segmentation algorithm based on the training data set to obtain a trained segmentation algorithm; and
    providing the trained segmentation algorithm.

13. A computer-implemented method for segmenting a whole-slide image depicting tissue of multiple tissue types in accordance with a plurality of different tissue types, the method comprising:
    providing the trained segmentation algorithm, the trained segmentation algorithm being trained using the method of claim 12;
    providing the whole-slide image; and
    applying the trained segmentation algorithm to the whole-slide image to segment the whole-slide image in accordance with the plurality of different tissue types.

14. A non-transitory computer-readable medium including program elements that, when executed by a computing unit of a system, cause the system to perform the method of claim 1.

15. A computer-implemented method for providing a training data set for training a segmentation algorithm, the method comprising:
- obtaining a whole-slide image depicting a tissue slice, the whole-slide image depicts the tissue slice stained with a first histopathological stain;
- obtaining a first segmentation of the whole-slide image and for a plurality of different tissue types, the first segmentation having a first level of detail;
- obtaining an annotation of the tissue slice by obtaining a complementary whole-slide image different from the whole-slide image, processing the complementary whole-slide image to obtain the annotation of the tissue slice, the annotation having a level of detail greater than the first level of detail and the complementary whole-slide image depicting the tissue slice or a proximal tissue slice of the tissue slice stained with a second histopathological stain different than the first histopathological stain;
- generating a second segmentation of the whole-slide image and for the plurality of different tissue types based on the first segmentation and the annotation, the second segmentation having a level of detail greater than the first level of detail; and
- providing the training data set, the training set comprising the whole-slide image and the second segmentation,
- wherein obtaining the complementary whole-slide image includes
  - providing an image processing function configured to simulate image data depicting a tissue slice stained with the second histopathological stain based on image data of the tissue slice stained with the first histopathological stain, and
  - generating the complementary whole-slide image by applying the image processing function on the whole-slide image.

* * * * *